United States Patent
Inanc et al.

(10) Patent No.: US 11,067,716 B2
(45) Date of Patent: Jul. 20, 2021

(54) SYSTEM AND METHOD FOR A DOWNHOLE GAMMA RAY INSTRUMENT

(71) Applicant: Baker Hughes Oilfield Operations LLC, Houston, TX (US)

(72) Inventors: Feyzi Inanc, Houston, TX (US); Peng Yuan, Houston, TX (US); Marc Ramirez, Houston, TX (US); Allan Jones, Spring, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/727,109

(22) Filed: Dec. 26, 2019

(65) Prior Publication Data
US 2020/0132880 A1    Apr. 30, 2020

Related U.S. Application Data

(63) Continuation-in-part of application No. 16/590,796, filed on Oct. 2, 2019.

(60) Provisional application No. 62/741,724, filed on Oct. 5, 2018.

(51) Int. Cl.
*G01V 5/12*    (2006.01)

(52) U.S. Cl.
CPC ....................... *G01V 5/12* (2013.01)

(58) Field of Classification Search
CPC ........ G01V 5/101; G01V 5/125; G01V 5/107; E21B 47/017; E21B 47/085; E21B 47/11
See application file for complete search history.

(56) References Cited

U.S. PATENT DOCUMENTS 2,806,147 A * 9/1957 Stellmacher ............. G21K 1/04
250/338.1

FOREIGN PATENT DOCUMENTS

DE    10034810 A1 *  1/2002  ............... G01V 5/12

OTHER PUBLICATIONS

Marco F. Duarte et al., "Single-Pixel Imaging via Compressive Sampling," Mar. 2008, IEEE Signal Processing Magazine, pp. 83-91.
Microsoft Research, "Compressive Sensing," Sep. 6, 2016, https://www.youtube.com/watch?v=zytez36XICU.

* cited by examiner

*Primary Examiner* — David P Porta
*Assistant Examiner* — Fani Boosalis
(74) *Attorney, Agent, or Firm* — Hogan Lovells US LLP

(57) ABSTRACT

A downhole logging tool includes a radiation generation source operable to emit radiation into a formation surrounding the tool and a radiation detector operable to detect backscattered radiation from the formation surrounding the tool. The tool also includes a sleeve positioned around the radiation generation source, the sleeve including at least one aperture for forming a pathway for a radiation beam, emitted from the radiation generation source, to enter the formation, the sleeve being rotatable about an axis of the tool to change a position of the aperture to distinctly inspect different regions of the formation.

18 Claims, 11 Drawing Sheets

SYSTEM AND METHOD FOR A DOWNHOLE GAMMA RAY INSTRUMENT

CROSS REFERENCE TO RELATED APPLICATIONS

This application is a continuation-in-part of co-pending U.S. patent application Ser. No. 16/590,796 filed Oct. 2, 2019 titled "SYSTEMS AND METHODS FOR DOWNHOLE LOGGING WITH ENHANCED SENSITIVITY AND AZIMUTHAL RESOLUTION," which claims priority to U.S. Patent Application No. 62/741,724 filed Oct. 5, 2018 titled "SYSTEMS AND METHODS FOR DOWNHOLE LOGGING WITH COMPRESSED SENSING," the disclosures of which are incorporated herein by reference in their entireties.

BACKGROUND OF THE DISCLOSURE

1. Field of the Disclosure

This invention relates in general to downhole logging, and more particularly to systems and methods for performing improved downhole logging.

2. Brief Description of Related Art

Downhole logging tools are used to collect various data about a wellbore or well system. For example, gamma ray logging tools may be used to detect wellbore properties, such as formation density, among others. Some gamma ray instruments send gamma rays into a formation and detect those that are scattered back. Energy levels of the backscattered radiation may be utilized to determine one or more formation properties. Typically, a source is collimated so that the gamma rays are sent in a certain direction. Often, the detector is collimated as well. As a result, azimuthal resolution is missing from traditional instruments without rotating the source and/or tool, which is time consuming and challenging.

SUMMARY OF THE DISCLOSURE

Applicants recognized the problems noted above herein and conceived and developed embodiments of systems and methods, according to the present disclosure, for utilizing downhole gamma ray instruments.

In an embodiment, a downhole logging tool includes a radiation generation source operable to emit radiation into a formation surrounding the tool and a radiation detector operable to detect backscattered radiation from the formation surrounding the tool. The tool also includes a sleeve positioned around the radiation generation source, the sleeve including at least one aperture for forming a pathway for a radiation beam, emitted from the radiation generation source, to enter the formation, the sleeve being rotatable about an axis of the tool to change a position of the aperture to distinctly inspect different regions of the formation.

In another embodiment, a system for performing downhole logging operations in a well includes a downhole suspension device and an inspection tool coupled to and lowerable into the well, via the suspension device. The inspection tool includes a radiation source operable to emit radiation. The inspection tool also includes a radiation detector operable to detect backscattered radiation generated as a result of the radiation emitted from the radiation source. The inspection tool further includes a sleeve positioned around the radiation source, the sleeve including at least one aperture, wherein a position of the at least one aperture is changeable with respect to the well.

In an embodiment, a method of performing downhole logging includes positioning an inspection tool in a well, the inspection tool comprising a radiation generation source, a radiation detector, and a sleeve positioned around the radiation source at a first position with respect to the well, the sleeve including at least one aperture. The method also includes emitting radiation from the radiation generation source, the radiation being directed through the at least one aperture. The method further includes detecting backscattered radiation received at the radiation detector. The method also includes determining a first measurement based on the detected backscattered radiation. The method further includes associating the first measurement with a first region of the well, corresponding to the first position of the at least one aperture. The method also includes determining one or more characteristics of the first region of the well, based at least in part on the first measurement.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE PREFERRED EMBODIMENT

Figure 1:
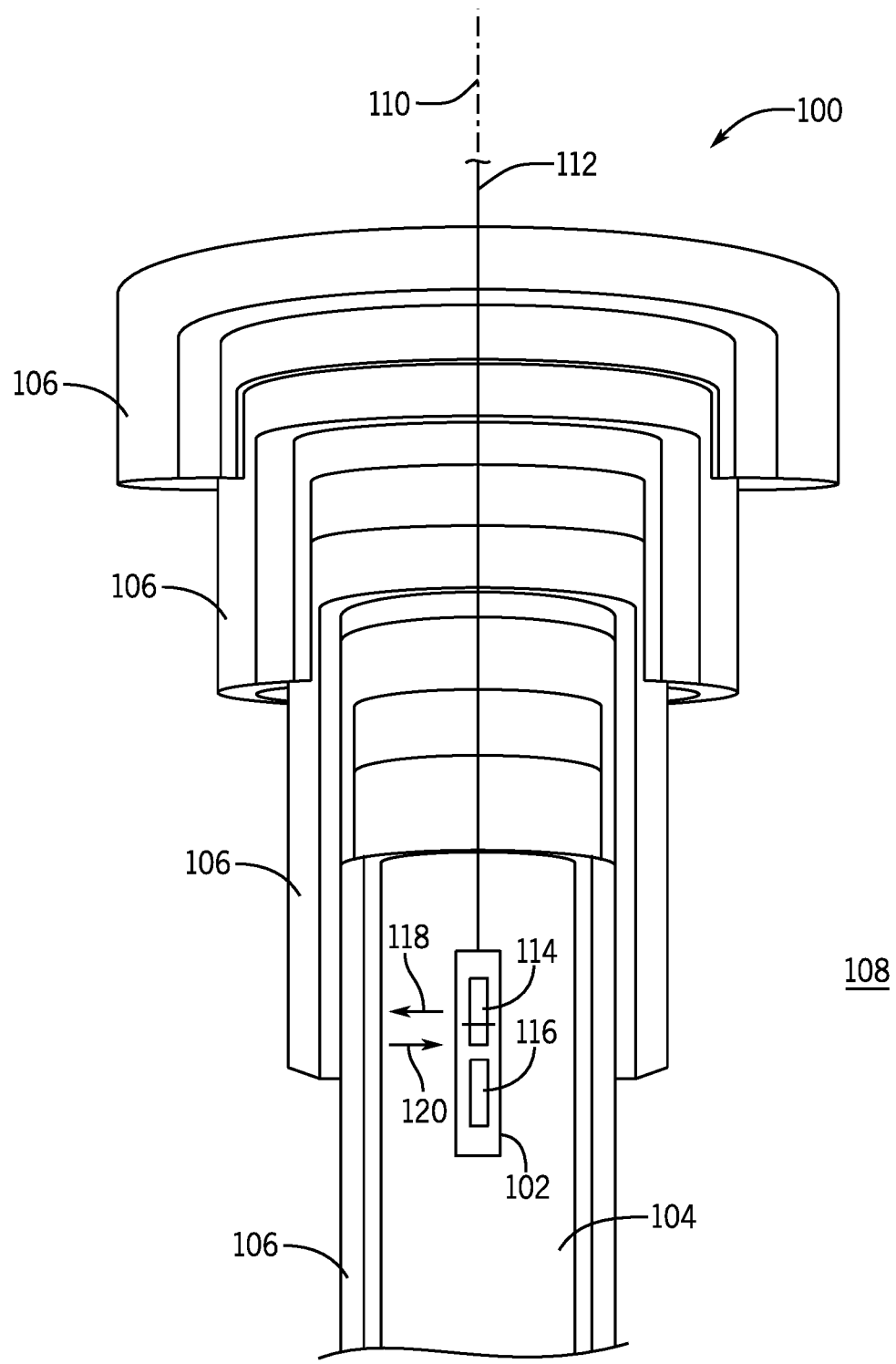
FIG. 1 is a schematic cross-sectional view of an embodiment of a downhole logging tool positioned in a wellbore, in accordance with various embodiments.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Furthermore, like reference numbers may be used between figures to illustrate like components, but it should be appreciated that embodiments are not limited to utilizing like components.

Embodiments of the present disclosure include a logging tool having a collimator assembly including rotatable and/or movable collimator sleeves that may adjust a pathway for radiation emitted from a source, such as a gamma ray source/signal. In various embodiments, the collimator assembly includes one or more sleeves that include one or more apertures. The sleeves are moved, such as via motors that drive rotation about the source, to align the apertures in the respective sleeves, thereby forming a pathway for radiation to enter a formation. The position of the pathway (e.g., the apertures) may be regulated by a spatial encoding pattern that may optimize and/or particularly select certain azimuthal positions of the wellbore to interrogate. In various embodiments, the logging tool further includes a detector that receives backscatter radiation from the formation. The information acquired by the detector, along with the position of the pathway, may be processed via a compressive sensing algorithm in order to determine characteristics of the formation and generate an azimuthal profile of the formation. However, it should be appreciated that in certain embodiments, compressive sensing algorithms may not be utilized and other methods, such as identity matrix methods, may be used.

In various embodiments, a gamma ray source/signal is collimated using spatial encoding patterns that may be programmed according to some user-selected optimization. Collimation may include two shielding housings around the gamma ray source, for example, but it should be appreciated that one shielding housing, three shielding housings, or any reasonable number of shielding housings may be used. In embodiments with multiple collimation housings, each housing includes collimation channels. The collimation channels, however, may be arranged in different patterns, as will be described below. In operation, gamma rays pass through two housings only if the collimation channel(s) on the two housing are connected/aligned and form a path for gamma rays. Example configurations will be described herein. In various embodiments, the collimation housings may be formed from a collection of combination of materials that either block or permit gamma rays paths. For example, dense materials make up the blocking material, whereas less dense material occupies open windows or apertures that form the collimation channels. By rotating one of the housings or both at varying angular speeds or increments, different collimation patterns and thus spatial encoding can be formed. In one example, the source-collimated rotations can be controlled by using a constant rotating motor or a Geneva drive, for example. As for collimation patterns, depending on requirements to satisfy a compressive sensing method, either random patterns or some predefined patterns can be used. Moreover, the compressive measurements obtained (i.e. the gamma rays detected) are now carrying azimuthal information and can be reconstructed to get azimuthal information for the regions of interest (e.g., locations of the formation interrogated by the gamma rays). Embodiments are directed toward collimating the source, rather than the detector, because it is desirable to maintain a large detector volume, whereas the source volume is relatively smaller. However, it should be appreciated that similar collimation may be utilized with respect to the detector.

FIG. 1 is a partial cross-sectional view of a well system 100 in which a downhole logging tool 102 is positioned to measure one or more characteristics of the well system 100, in accordance with one or more embodiments. The illustrated well system 100 includes a multi-barrier well 104 with a plurality of barriers 106, such as tubing, cement layers, casing, and the like. The well 104 may be any type of well, including but not limited to conventional and unconventional hydrocarbon producing wells. Moreover, the well 104 may include deviated or angled sections. The logging tool 102 may be deployed downhole into the well 104 to perform various logging functions, such as detection of various anomalies, such as well defects, eccentricity, flaw structure, topology, integrity, and other information. Additionally, in various embodiments, the logging tool 102 may be deployed to obtain information indicative of wellbore and/or formation characteristics, such as formation density. In various embodiments, the logging tool 102 may include an imaging device such as a nuclear imaging device, or various other types of logging devices such as acoustic devices, electromagnetic devices, magnetic resonance devices, other forms of radiation-based devices, among others.

In the illustrated embodiment, the well system 100 includes a series of tubular barriers 106, which may include metallic casings or tubings and cement walls between the casings. Specifically, in various embodiments, the wellbore may be cased by the tubular casings and held into place against the formation 108 and/or other casing sections via cement forming the cement walls. It may be desirable to inspect various characteristics of the casing and/or the cement walls, for example for potential abnormalities or defects such as fluid channel defects, bonding defects, air voids, defects in the casing, annulus defects, cement bonding defects, eccentricity of the well, among others. Moreover, certain logging methods may be difficult to perform through the barriers 106. Abnormalities or defects may be referred to as wellbore characteristics and may further include additional information such as formation properties and the like.

Moreover, as noted above, logging tools may be useful in determining one or more characteristics of the formation. However, in multi-barrier wells, logging tools may need sufficient strength and/or intensity in order to penetrate into the formation 108 through the barriers 106. One such tool composition is a nuclear logging tool, such as a gamma ray instrument. The gamma ray instrument includes at least one source and at least one detector. The source emits gamma rays into the formation and the detector receives backscattered radiation. The gamma ray instrument enables a variety of different measurements, such as formation density. Furthermore, it should be appreciated that various other nuclear logging tools may be utilized that include different sources, such as neutrons.

In the illustrated embodiment, the logging tool 102 traverses into the well 104 along a well axis 110 and is supported by a wireline 112, which may be a cable reinforced for wellbore operations and further including conductive materials to transfer energy and data signals. It should be appreciated that while a wireline system is illustrated in FIG. 1, embodiments of the present disclosure may be disposed on rigid tubing, coiled tubing, and with various other wellbore tubing structures.

It should be appreciated that various embodiments discussed herein describe logging tool 102 as a gamma radiation imaging tool, which may include a radiation generation unit 114 and a radiation detection unit 116. The radiation generation unit 114 may emit radiation 118 toward the formation 112 and possibly through one or more barriers, which may interact with one or more targets or regions of interest and produce a backscatter stream 120 of radiation toward the radiation detection unit 116. In various embodiments, the radiation generation unit 114 is a gamma ray emitter (e.g., Cesium-137). The radiation generation unit 114 may include a source that emits gamma rays isotropically and then is collimated to direct those gamma rays in a particular direction. Due to the stochastic nature of radiation emission, the source used for the radiation generation unit 114 may continuously emit gamma rays, which may be shielded or blocked until it is desired to emit the gamma rays into the formation. It should be appreciated that other sources may also be used, such as cyclic particle accelerators and the like. Although the present disclosure uses gamma ray logging tools as an example, in some embodiments, the logging tool 102 may include an X-ray logging tool or other energy and/or radiation emitter. In some embodiments, the logging tool 102 may include a neutron tool. In some embodiments, the logging tool 102 may include an electromagnetic imaging tool.

In previous gamma ray instruments, the source of the radiation generation unit 114 and the radiation detection unit 116 may be collimated. As a result, emission of the gamma rays is known in a particular direction, and subsequent detection comes from a particular direction. This configuration leads to a lack of azimuthal resolution, which may be undesirable. For example, the tool may be reset and multiple logging runs may be processed in order to try to evaluate different areas of the formation, increasing costs for conducting the logging operation.

In some cases, the detector is collimated as well, and as a result, receives gamma rays from that certain direction. With such a design, there is no discrimination of the borehole azimuth as the detected gamma rays are from a certain azimuthal direction. Embodiments of the present disclosure are directed toward collimating the gamma ray source using spatial encoding functions that are mechanically introduced, such that the collimation either happens randomly with respect to the azimuthal direction or follows some pre-defined patterns. By doing so, azimuthal information about surrounding areas can be obtained and compressive sensing (CS) techniques can be used to further reduce required acquisition time, in-turn accelerating the logging procedure.

Compressive sensing (e.g., compressive sampling, sparse sampling) is a signal processing technique. By finding solutions to underdetermined linear systems, CS can efficiently acquire and reconstruct a signal. To faithfully reconstruct a signal, two conditions need to be met. The first one is sparsity, which requires the signal to be sparse in some domain. The second one is incoherence. Relying on the sparsity and incoherence of the signals, CS enables one to sample the signal at a rate much below the sampling rate required by Nyquist-Shannon sampling theorem. Furthermore, through optimization, the varied reconstruction algorithms of CS can then faithfully reconstruct the original signal back from fewer compressive measurements. The benefit being an accurate spatial mapping of the scattered gamma rays back to the detector in a reduced acquisition time.

Embodiments of the present disclosure utilize these advantages by collimating the gamma ray source/signal using spatial encoding patterns that can be programmed according to some user-selected optimization and/or the like. This may be achieved by having two shielding housings around a gamma ray source, for example. Each of the shielding housings may include one or more collimation channels, which may be configured with different patterns. Gamma rays will pass through two housings only if the collimation channel(s) on the two housing are connected/aligned and form a path for gamma rays. In embodiments, dense materials make up the blocking material, whereas less dense material occupies the open windows or apertures. By rotating one of the housings or both at varying angular speeds or increments, different collimation patterns and thus spatial encoding can be formed. In one example, the source-collimated rotations can be controlled by using a stepper motor or a Geneva drive, for example. However, it should be appreciated that other systems may be implemented to drive rotation of the source collimator. As for collimation patterns, depending on the requirement to satisfy the CS method, either random patterns or some pre-defined patterns can be used. Finally, the compressive measurements obtained (i.e. the gamma rays detected) are now carrying azimuthal information hence can be reconstructed to get azimuthal information for the regions of interest.

Figure 2:
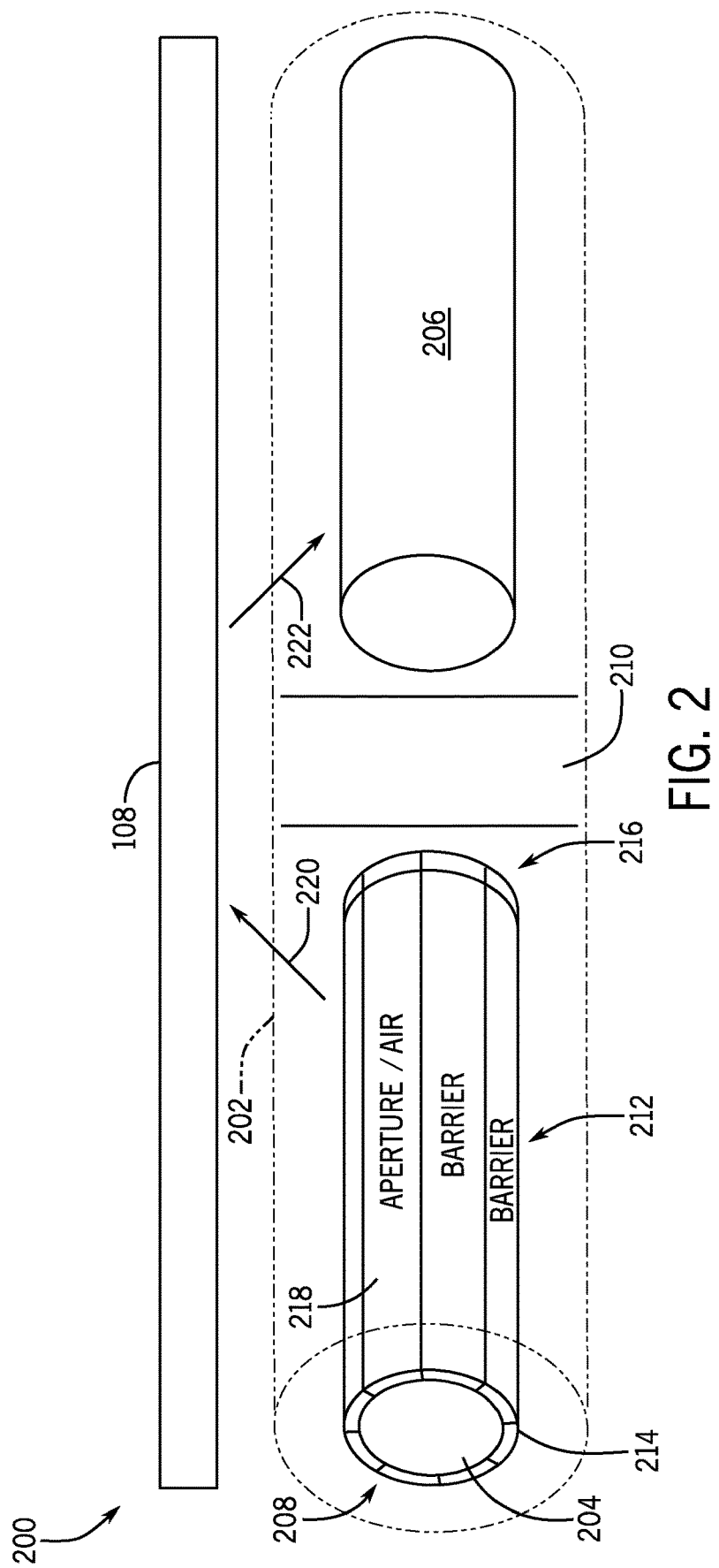
FIG. 2 is a schematic view of an embodiment of a downhole logging tool, in accordance with various embodiments.

FIG. 2 illustrates a representation of components of a downhole logging tool 200 with capability for variable aperture positions, in accordance with various embodiments. In the illustrated embodiment, the tool 200 includes a housing 202 having a radiation source 204 and a radiation detector 206 arranged within an interior volume 208 of the housing 202. It should be appreciated that radiation source 204 and the radiation detector 206 may be arranged within separate housings 202, but for clarity and conciseness, the detector and source will be described as being in a common housing 202. An optional barrier 210 is arranged between the source 204 and the detector 206. The barrier 210 may be formed of a high-density material, such as lead, to block gamma ray emission from the source 204 toward the detector 206.

The illustrated source 204 is a gamma ray source, which may include a chemical source or the like, as described above. The source 204 is arranged within a collimation assembly 212 that may be utilized to azimuthally direct a beam emitted from the gamma ray source 204 into the formation 108. The illustrated collimation assembly 212 includes a circumferential sleeve 214 that substantially surrounds the source 204. A cap (not illustrated to provide a view of the source 204) and a bottom 216 are further included. As a result, emission of gamma rays from the collimation assembly 212 may be blocked in multiple directions, with the exception of an aperture 218 in the sleeve 214, exposing the source 204. The sleeve 210 may be rotatable with respect to the source 204 and/or with respect to the formation 108 such that the aperture 218 may move between a plurality of positions around the detector and with respect to the formation 108. The sleeve 214 may be made of a material that blocks or partially blocks radiation. For example, high-density materials, such as lead, may be advantageous for blocking gamma rays.

In operation, the tool 200 may be arranged in the wellbore formed in the formation 108 and the source 204 may emit gamma radiation into the formation 108. In the illustrated embodiment, a beam 220 travels through the aperture 218 and into the formation 108. However, it should be appreciated that the gamma rays may not be emitted as a continuous beam and that the emission may be based, at least in part, on the selected source and its activity. The gamma rays may interact with particles in the formation 108 and backscatter radiation, illustrated by the arrow 222, is directed toward the detector 206. The housing 202 may be made of a material that does not block (or at least partially permits) backscattered radiation. The detector 206 may be a scintillation detector, such as a Na-detector, that measures the energy levels of the backscattered radiation 222. This information may be recorded, such as via an onboard memory or at the surface, and the information may be evaluated to determine one or more formation properties. Furthermore, various electronics, as will be described below, may be included to record and/or control the position of the aperture 218.

Figure 3:
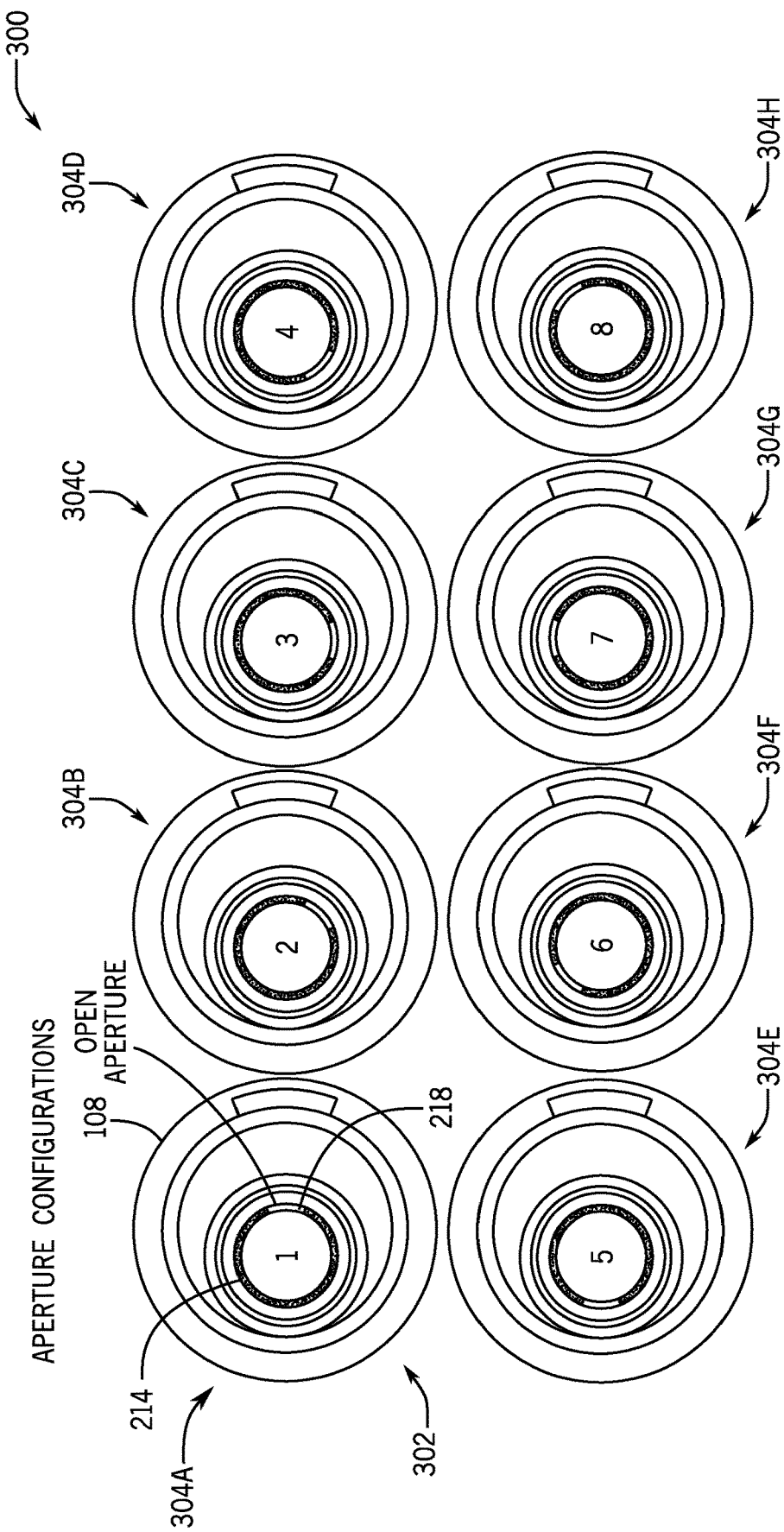
FIG. 3 is a schematic top view of an embodiment of a downhole logging tool illustrating various collimator positions, in accordance with various embodiments.

FIG. 3 illustrates a series of cross-sectional views 300 of the downhole logging tool 200 positioned inside a well 302 with the aperture 218 at various positions 304A-304H with respect to the well, in accordance with various embodiments. The illustrated aperture 218 is formed in the sleeve 214. It should be appreciated that while the illustrated embodiment includes a single sleeve 214, other embodiments may include more than one sleeve, such as two sleeves, three sleeves, etc. As described above, the sleeve 214 may be rotatable about the source 204 such that different azimuthal positions of the well 302 are interrogated by the gamma rays emitted from the source 204. By recording the time the gamma rays are emitted and the position 304A-304H of the aperture 218, along with interaction data from the detector (not pictured) an azimuthal profile of the well may be established.

Figure 4:
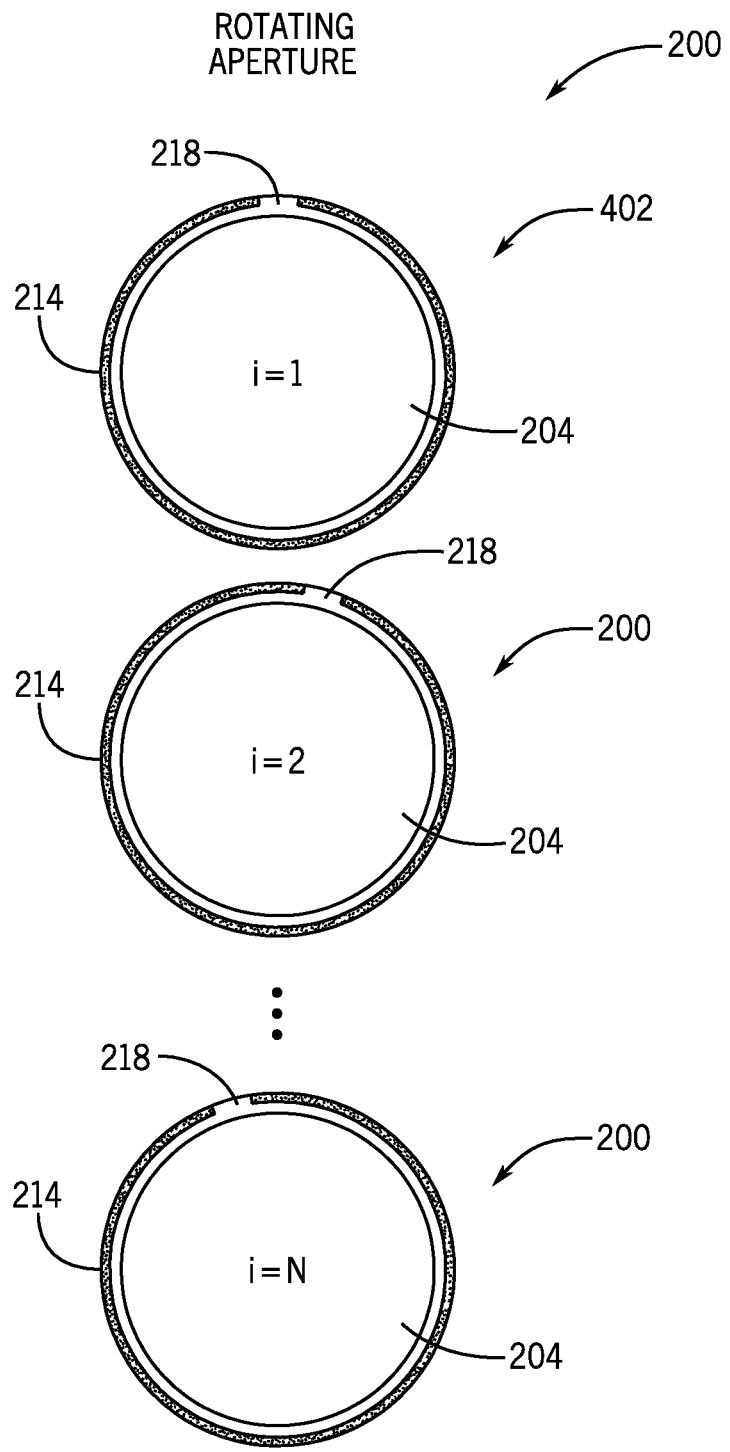
FIG. 4 is a schematic top view of an embodiment of a downhole logging tool illustrating various collimator positions, in accordance with various embodiments.

FIG. 4 illustrates an example representation of the logging tool 200. The illustrated embodiment includes a single sleeve 214 having a single aperture 218. However, as will be described below, in various embodiments there may be more sleeves 214 and more apertures 218. The illustrated sleeve 214 is driven to rotate about the source 204, thereby changing the azimuthal position of the aperture 218. As a result, gamma rays emitted from the source 204 will be directed in a direction substantially aligned with the aperture 218. In the illustrated embodiment, there are N number of discrete aperture positions, providing a corresponding azimuthal resolution of roughly 360°/N.

Figure 5:
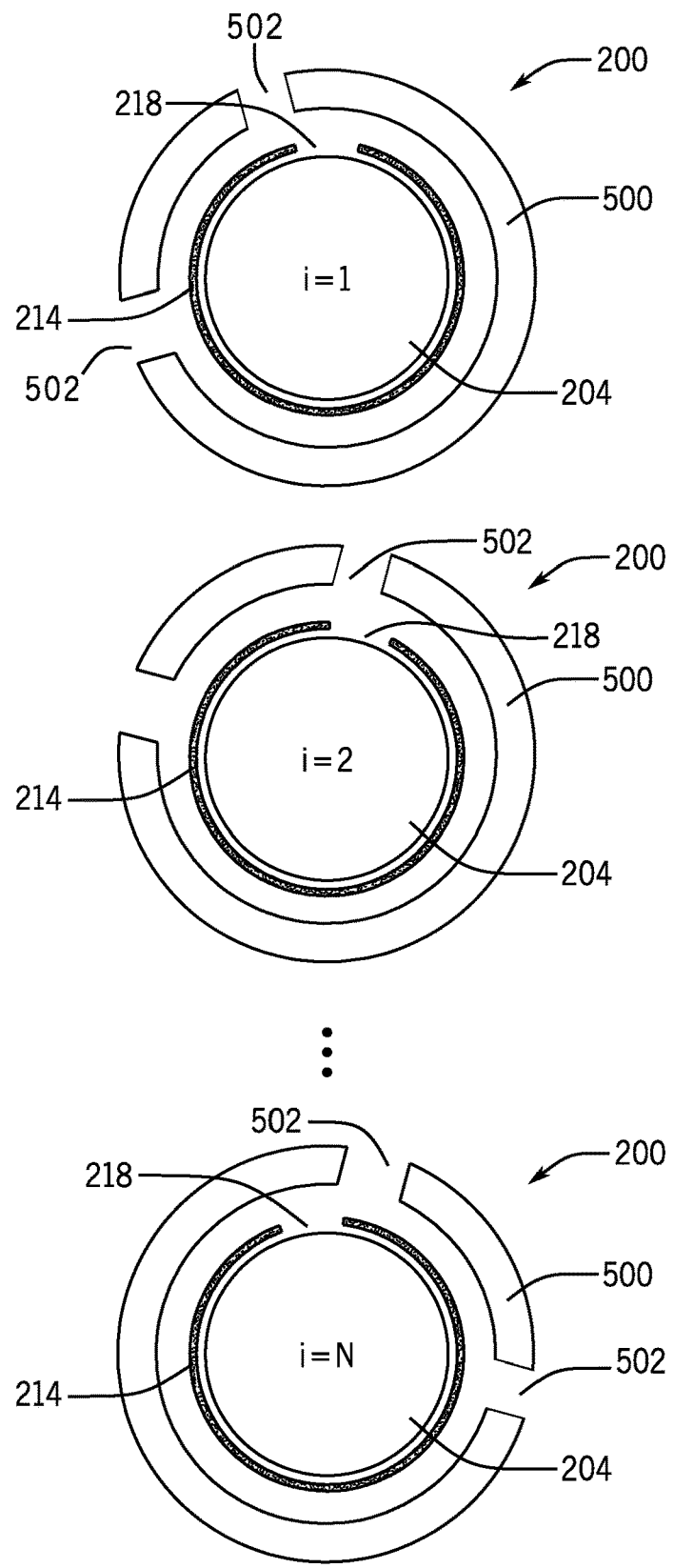
FIG. 5 is a schematic top view of an embodiment of a downhole logging tool illustrating various collimator positions, in accordance with various embodiments.

FIG. 5 illustrates an example representation of the logging tool 200. In the illustrated embodiment, there are two sleeves 214, 500 each having an independent aperture 218, 502. The illustrated sleeve 500 includes two different apertures 502, which are offset by an angle. It should be appreciated that two apertures 502 are shown for illustrative purposes only, and that in other embodiments there may be more or fewer. As described above, in various embodiments, multiple sleeves 214, 500 may be utilized to further adjust the azimuthal resolution. For example, only portions of the respective apertures 218, 502 may overlap, thereby forming a smaller beam/pathway than embodiments where the apertures 218, 502 substantially align. Additionally, the sleeves 214, 500 may rotate at different speeds, thereby providing different aperture configurations that form pathways to the formation.

Figure 6:
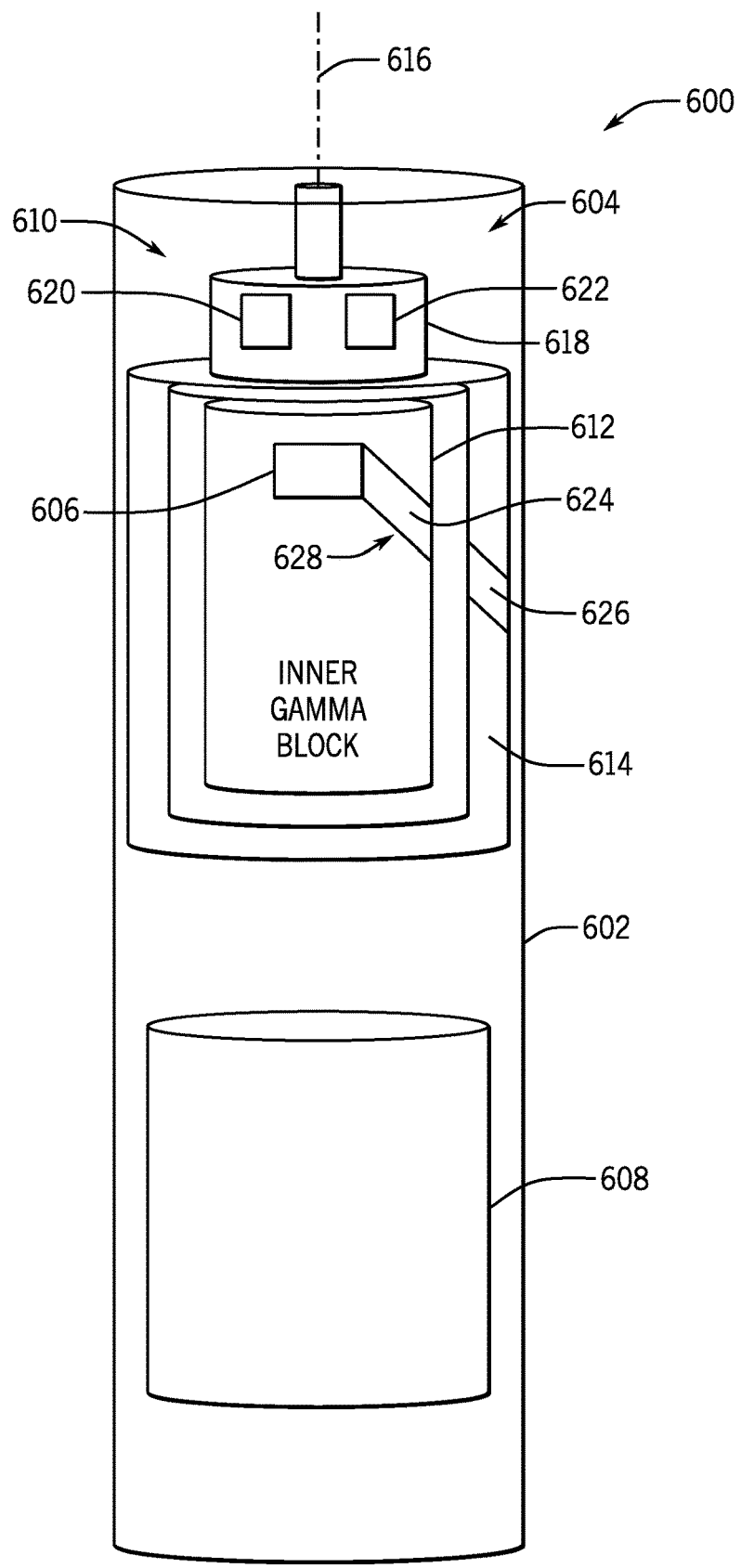
FIG. 6 is a schematic cross-sectional view of an embodiment of a downhole logging tool including a collimation assembly, in accordance with various embodiments.

FIG. 6 is a schematic cross-sectional view of an embodiment of a logging tool 600, which may share one or more features with the logging tool 200. The illustrated logging tool 600 includes a housing 602, which may receive one or more additional components. The housing 602 may be formed from a material that has sufficient strength for a downhole environment, but that also enables emission of gamma rays into the formation. In various embodiments, the housing 602 may include one or more windows, which may be formed from different material than the remainder of the housing. For example, the housing 602 may be substantially metallic while the windows are transparent or semi-transparent to the radiation backscattered from the formation.

The housing 602 includes an interior volume 604 that includes a radiation source 606, such as a gamma ray source, and a radiation detector 608, such as a gamma ray detector. In the illustrated embodiment, the source 606 is arranged uphole of the detector 608 (e.g., in an arrangement that would be closer to the surface), however, it should be appreciated that the source 606 may be downhole of the detector 608. Moreover, while the illustrated embodiment includes a single detector 608, it should be appreciated that additional detectors 608 may be included, for example, to form a detector array.

A collimation assembly 610 is arranged to substantially surround the source 606. The illustrated collimation assembly 610 includes an inner sleeve 612 (e.g., inner collimator, first sleeve) and an outer sleeve 614 (e.g., outer collimator, second sleeve). The sleeves 612, 614 are coaxially aligned about an axis 616 of the tool 600 with the inner sleeve 612 having a smaller diameter than the outer sleeve 614. Each of the inner and outer sleeves 612, 614 may be arranged to be independently rotatable about an axis 616. For example, a motor block 618 may include an inner sleeve motor 620 (e.g., inner collimator motor, first motor) and an outer sleeve motor 622 (e.g., outer collimator motor, second motor). While the illustrated embodiment includes two motors 620, 622, it should be appreciated that more or fewer motors may be included. For example, a single motor may be utilized to drive rotation of both the inner sleeve 612 and the outer sleeve 614. Additionally, additional motors may also be utilized to adjust one or more features of the rotation, such as changing a direction or increasing a speed of the rotation. The motors 620, 622 may drive rotation of the respective sleeves 612, 614 about the axis 616, which may facilitate aligning one or more apertures to collimate the gamma ray beam emitted from the source 606. In various embodiments, the motors 620, 622 may include gear systems or the like to facilitate rotation of the sleeves 612, 614. By way of example only, the motors 620, 622 may include a stepper motor or a Geneva drive.

As described above, in various embodiments spatial encoding patterns may be generated utilizing the inner sleeve 612 and the outer sleeve 614. For example, the inner sleeve includes a first channel or first aperture 624 that extends through the inner sleeve 612, thereby forming a path for gamma rays emitted from the source 606. The outer sleeve includes a second channel or second aperture 626 that extends through the outer sleeve 614. As illustrated, when the respective channels 624, 626 at least partially align, a pathway 628 is formed for gamma rays emitted from the source 606. As a result, a relative position of the channels 624, 626 may be utilized as information for developing an azimuthal profile of the formation.

It should be appreciated that FIG. 6 has been simplified for clarity and conciseness and that various elements have been omitted, but may be incorporated into the system. For example, a position indicator may be positioned proximate the motor block 618 in order to record a positon of the inner sleeve 612 and the outer sleeve 614, thereby establishing a position of the pathway 628. This position may be recorded along with a time signature, which may be recorded by a timer, in order to correlate counts received by the detector 608 with a position of the pathway 628. Additionally, other components such as memories, processors, communication modules, and the like may also be included with the tool 600.

Figure 7A:
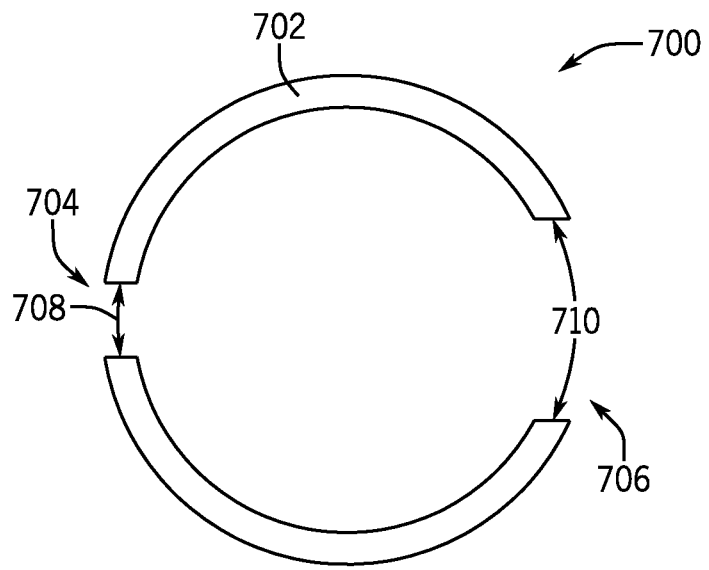
FIGS. 7A-7F are schematic top views of embodiments of apertures formed in a collimator, in accordance with various embodiments.

FIGS. 7A-7F are schematic cross-sectional views of embodiments of collimator configurations, which may be utilized with embodiments of the present disclosure. The illustrated embodiment include a single sleeve, however, it should be appreciated that multiple sleeves may be incorporated, as described above. FIG. 7A illustrates a sleeve configuration 700 including a sleeve 702 having a first opening or channel 704 and a second opening or channel 706. The first opening 704 has a first length 708 and the second opening 706 has a second length 710. As illustrated, the second length 710 is larger than the first length 708. However, it should be appreciated that the first length 708 may be larger than the second length 710 and/or the first length 708 and the second length 710 may be substantially equal. It should be appreciated that aperture size determines the counting statistics and precision. As a result, longer acquisition times would be used for smaller aperture sampling so that precision stayed the same through all aperture sizes.

Figure 7B:
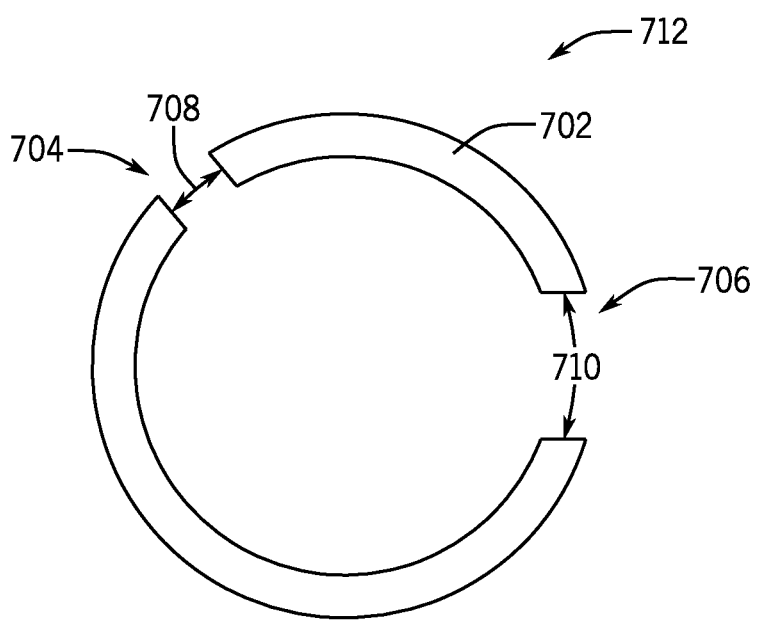

The arrangement of the respective openings 704, 706 of FIG. 7A illustrates axially aligned openings 704, 706 substantially 180 degrees apart at their respective midpoints. Such an arrangement is for illustrative purposes only, and the openings may not be arranged symmetrically about the sleeve 702. For example, FIG. 7B illustrates a sleeve configuration 712 where the first opening 704 and the second opening 706 are not aligned. As illustrated, the first opening 704 extends for the first length 708 and the second opening 706 extends for the second length 710, with the first length 708 being shorter than the second length 710. However, the respective midpoints are offset by approximately 100 degrees, as opposed to the configuration illustrated in FIG. 7A.

Figure 7C:
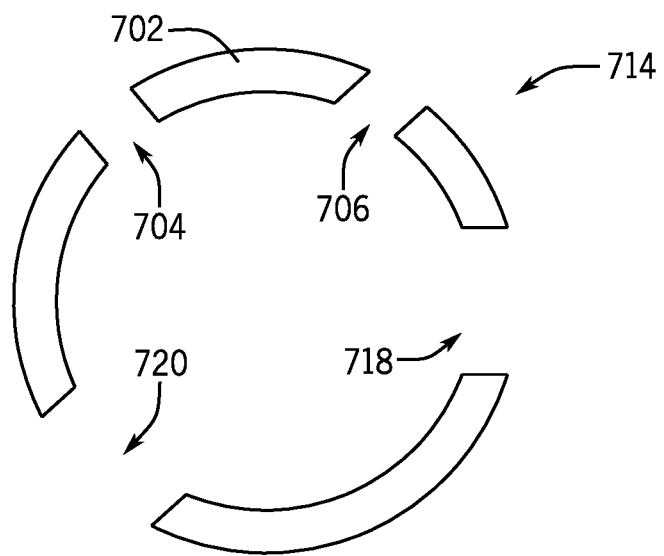
Figure 7D:
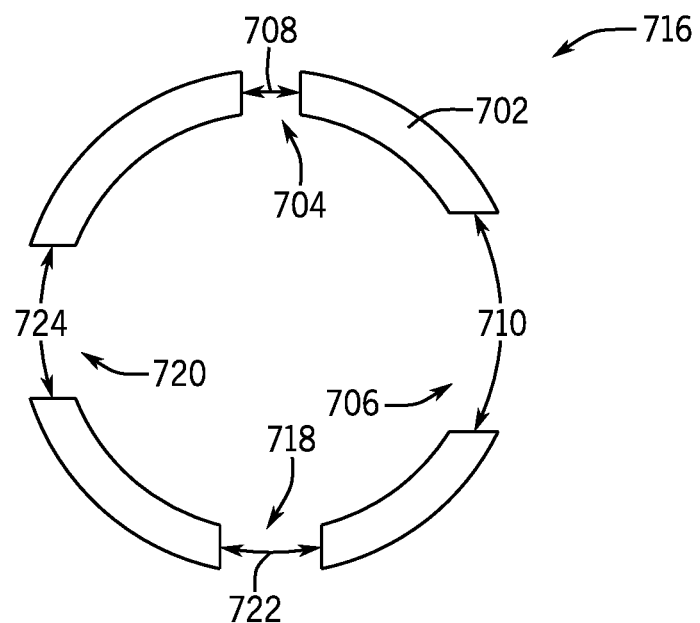

FIGS. 7C and 7D illustrate embodiments including more than two openings. For example, each of sleeve configurations 714, 716 of FIGS. 7C and 7D include a third opening 718 and a fourth opening 720. In the embodiment illustrated in FIG. 7C, the first, second, third, and fourth openings 704, 706, 718, 720 are arranged at different locations about the sleeve 702 such that the sleeve 720 is asymmetrical. In contrast, FIG. 7D is arranged to include the openings 704, 706, 718, 720 at 90 degree locations. However, as illustrated, the respective lengths are different. For example, the first length 708 is less than the second length 710, a third length 722, and a fourth length 724. Moreover, each of the first, second, third, and fourth lengths 708, 710, 722, 724 are different.

Figure 7E:
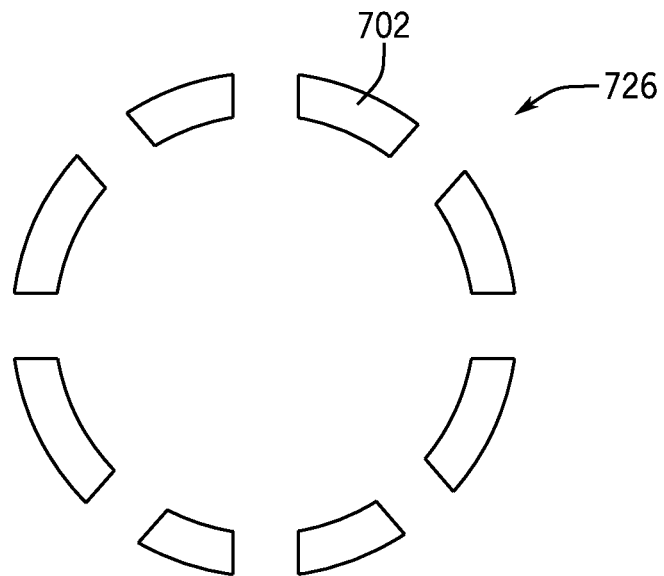
Figure 7F:
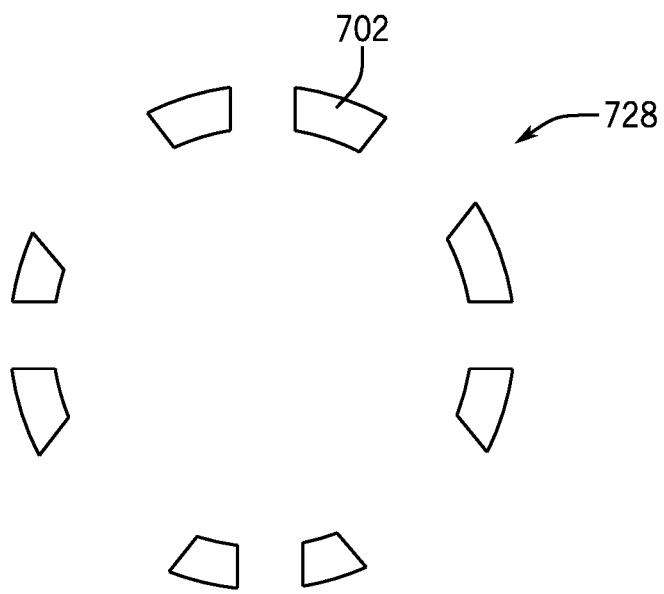

FIGS. 7E and 7F illustrate embodiments including patterns of openings. For example, each of the sleeve configurations 726, 728 are substantially symmetrical, with the respective openings arranged in a pattern about the sleeve 702. For example, each of the openings of FIG. 7E are substantially the same size and substantially equally spaced. The openings of FIG. 7F are substantially equally spaced, however, the openings have two different lengths. By way of example only, a variety of different configurations may be utilized using different sizes, different spacing, and different numbers of openings through the sleeve 702. Moreover, as described above, there may be more than one sleeve and, in various embodiments, the sleeves may have different numbers of openings and/or different sizes of openings. Accordingly, a variety of different patterns may be generated.

Figure 8A:
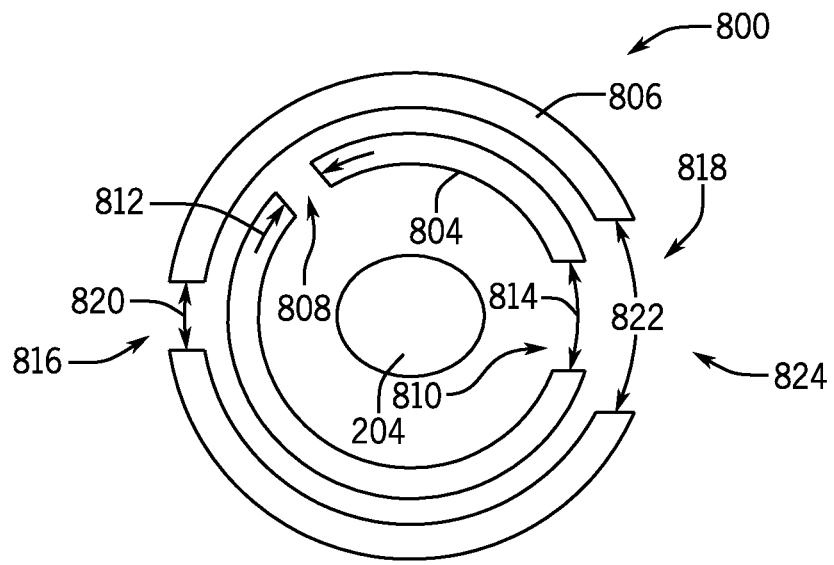
FIGS. 8A and 8B are schematic top views of embodiments of apertures formed in a collimator assembly, in accordance with various embodiments.
Figure 8B:
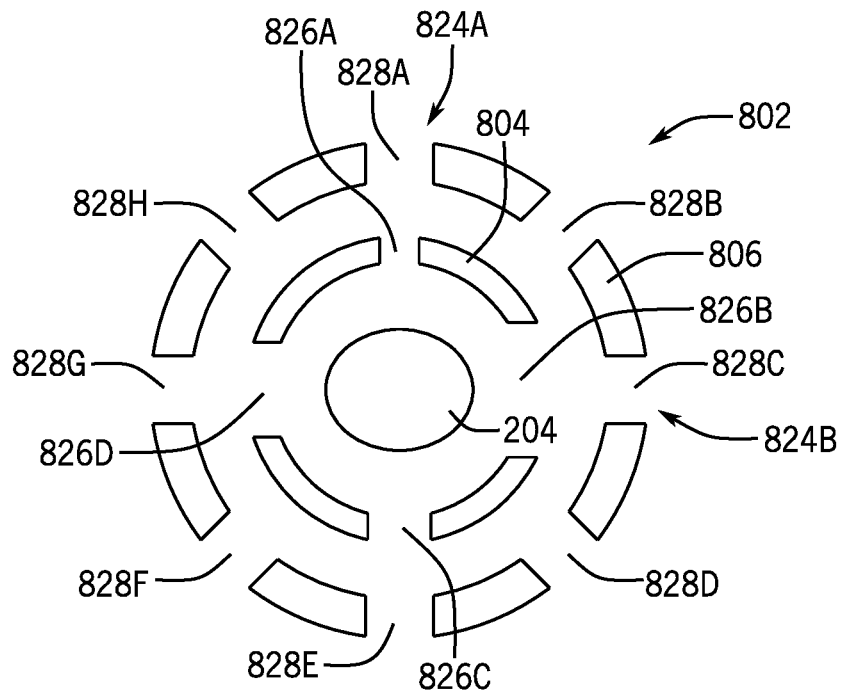

FIGS. 8A and 8B illustrate example collimation configurations 800, 802 utilizing an inner sleeve 804 an outer sleeve 806. Turning to the embodiment of FIG. 8A, the inner sleeve 804 includes a first channel 808 and a second channel 810. As noted above, the first channel 808 has a smaller first length 812 than a second length 814 of the second channel 810. The outer sleeve 806 of the illustrated embodiment include a third channel 816 and a fourth channel 818, with a third length 820 being smaller than a fourth length 822. In the current configuration, the second channel 810 is substantially aligned with the fourth channel 818 to form a pathway 824 through which gamma rays may flow from the source 204. However, gamma rays through the first channel 808 will encounter the outer sleeve 806. As a result, azimuthal information may be gathered by correlating detection information with the current position of the respective channels. It should be appreciated that the illustrated configuration provides just one of several potential pathways 824. For example, alignment (full or partial) between the first channel 808 and the third channel 816 may also form a pathway. Additionally, full or partial alignment between the first channel 808 and the fourth channel 818 and/or the third channel 816 and the second channel 810 may also generate a pathway.

FIG. 8B includes the inner and outer sleeves 804, 806 having a greater number of channels. For example, the inner sleeve 804 includes four different channels, represented as reference characters 826A-D and the outer sleeve 806 includes eight different channels, represented as characters 828A-H. Accordingly, as noted below, the inner and outer sleeves 804, 806 may include different numbers of channels being spaced in a different configuration. For example, in the illustrated embodiment, the channels 826A and 828A are aligned, forming a pathway 824A. Additionally, the channels 826B and 828C are aligned, forming another pathway 824B. As a result, different configurations may be utilized to generate multiple different pathways to provide a variety of different count configurations, which may be utilized to obtain azimuthal information of the wellbore, for example by interrogating different regions of interest.

Figure 9:
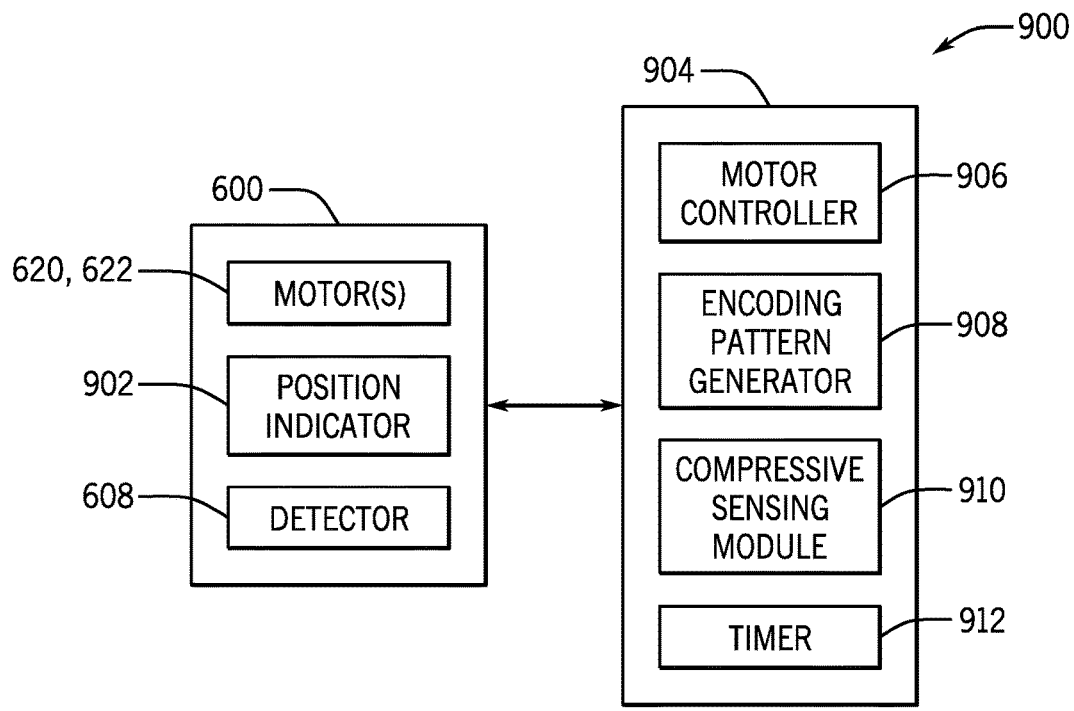
FIG. 9 is a schematic diagram of an embodiment of a logging tool system, in accordance with various embodiments.

FIG. 9 is a schematic diagram of an embodiment of a logging tool system 900 that may be utilized with the logging tool 600 in order to control operation and/or obtain information acquired by the logging tool 600. As illustrated, the logging tool system 900 includes the logging tool 600 that includes the motors 620, 622, a position indicator 902, and the detector 608. In various embodiments, the position indicator 902 may be omitted, for example, when the motors 620, 622 are directed to move in a specific pattern over a specific time interval. As noted above, in various embodiments, the motors 620, 622 drive rotation of an inner and outer sleeve (in embodiments including both the inner and outer sleeve) to provide pathways for radiation to emit from a source into the formation. While embodiments may be described as including an inner and outer sleeve (e.g., two sleeves), it should be appreciated that there may be more or fewer sleeves. The logging tool 600 may be in communication with a control system 904, which may include one or more processors and/or memories. The memory may be a non-transitory machine-readable medium that includes instructions that may be executed by the processor. Moreover, communication may be enabled by a variety of methods, including wired and wireless communication systems. The illustrated control system 904 includes a motor controller 906. The motor controller 906 may transmit a signal to the motors 620, 622 to drive rotation of the sleeves. The motor controller 906 may drive rotation to position the sleeves are particular locations, which may be obtained from an encoding pattern generator 908. As noted above, the encoding pattern may be programed for optimization with obtaining the azimuthal information about the wellbore. For example, the encoding pattern may be a continuous pattern of movement or may be random patterns. The position indicator 902 may record the locations of the various pathways generated via movement of the sleeves, thereby associating a certain position of the pathways with a particular encoding pattern.

Various embodiments also including a compressive sensing module 910, which may include a programming module utilizing process signals received from the logging tool 600, such as signals from the detector 608, the position indicator 902, and/or a timer 904. For example, the compressive sensing module 910 may receive information from the detector 608 that is correlated to a position of the sleeves, which may be related to the position indicator and/or a timer 912. However, as noted above, disclosure of the position indicator 902 is for illustrative purposes only, and in various embodiments, may be omitted. For example, position data may be known beforehand so that data being received by the CS module is minimized. That is, the CS module can have the aperture positions and then the aperture positions are given to the aperture controlling device (e.g., the motors). By way of example, the detector 608 may receive a certain number of counts at a certain time or over a period of time, which may be correlated to a position of the sleeves. This information may be utilized in order to generate the azimuthal profile. For example, the compressive sensing module may include information related to an encoding matrix (e.g., from the encoding pattern generator 908) and may use that pattern in order to reconstruct an image of the wellbore. It should be appreciated that the use of the compressive sensing algorithms may speed up the logging process. For example, a number of samples K may be obtained. These samples may be less than a resolution of the wellbore N. However, by utilizing the compressive sensing algorithm, the profile may be generated using K samples, thereby decreasing the time for data acquisition. Decreasing time for acquisition may decrease costs for the producer, which is desirable with oil and gas operations, where rig time is costly.

In various embodiments, encoding patterns may be developed prior to operation at the wellbore. For example, experimental operations may be evaluated in order to generate desirable encoding patterns. In various embodiments, machine learning techniques may be utilized to process various encoding patterns to determine optimal or preferred settings. Moreover, different encoding patterns may be used for different wellbores and/or different anticipated formation characteristics. In this manner, data acquisition may be adjusted to different formations to provide improved resolution with a reduced number of samples.

Figure 10:
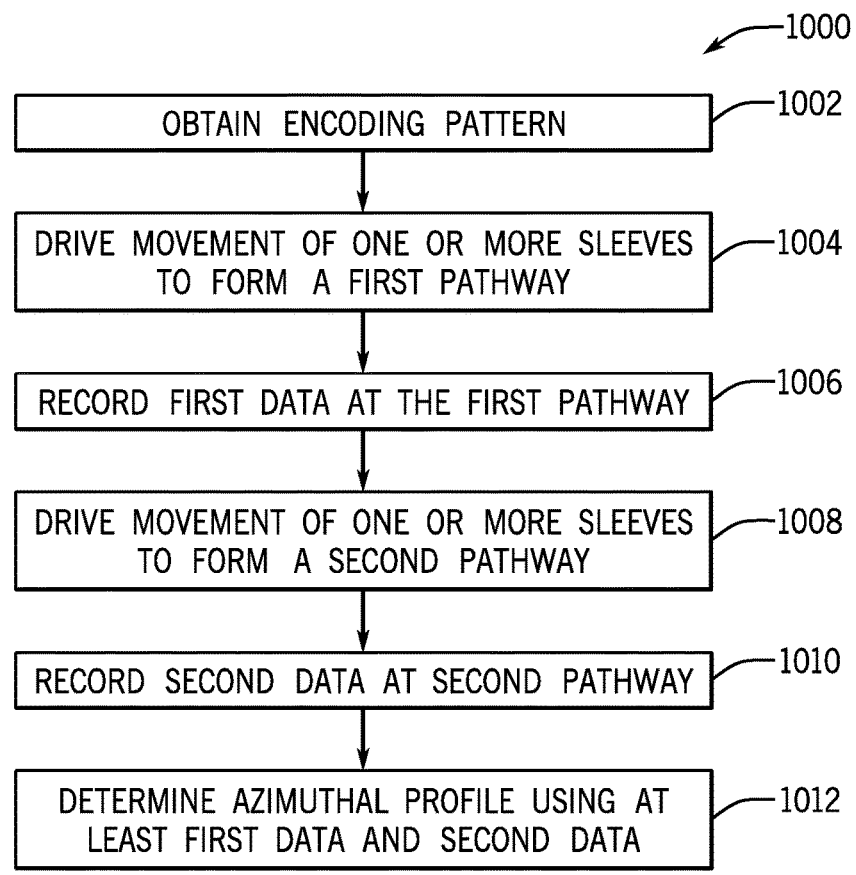
FIG. 10 is a flow chart of an embodiment of a method for performing downhole logging operations, in accordance with various embodiments.

FIG. 10 is a flow chart of an embodiment of a method 1000 for determining an azimuthal profile from a wellbore. It should be appreciated that the steps of the method may be performed in a different order, or in parallel, and there may be more or fewer steps, unless specifically noted otherwise. In this example, an encoding pattern is obtained 1002. The encoding pattern may correspond to a pattern in which one or more sleeves will be rotated about a source to change a location of a pathway. For example, as described above, the one or more sleeves may include channels, which may be moved into and out of alignment, thereby forming or blocking pathways for radiation emission. The encoding pattern, in various embodiments, may be a specified pattern, however, the encoding pattern may also be random or semi-random.

Movement of the one or more sleeves forms a first pathway 1004. For example, the sleeves may be rotated about an axis in order to align one or more channels of the sleeves. First data may be recorded while the first pathway is formed 1006. For example, radiation in the form of gamma rays may be directed toward the formation and a radiation detector may receive backscatter radiation, which is recorded. Then, the sleeves may be driven to form a second pathway 1008. For example, one or more of the sleeves may rotate about the axis. Thereafter, second data may be recorded 1010. The second data may correspond to information received while the second pathway is formed. The first and second data may be used, at least in part, to determine an azimuthal profile 1012. For example, a compressive sensing algorithm may be utilized to generate the azimuthal profile. In various embodiments, compressive sensing algorithms may reduce a number of data point for forming the azimuthal profile, thereby decreasing time and cost with obtaining the information.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:
1. A downhole logging tool, comprising:
 a radiation generation source operable to emit radiation into a formation surrounding the tool;
 a radiation detector operable to detect backscattered radiation from the formation surrounding the tool;
 a sleeve positioned around the radiation generation source, the sleeve including at least one aperture for forming a pathway for a radiation beam, emitted from the radiation generation source, to enter the formation, the sleeve being rotatable about an axis of the tool to change a position of the aperture to distinctly inspect different regions of the formation; and
 a second sleeve positioned coaxially and radially outward from the sleeve, the second sleeve including at least one second aperture, wherein the pathway is formed when the at least one aperture and the at least one second aperture at least partially align.
2. The system of claim 1, wherein the at least one aperture comprises a plurality of apertures, the plurality of apertures positioned about the sleeve.

3. The system of claim 2, wherein a first length of a first aperture of the plurality of apertures is different from a second length of a second aperture of the plurality of apertures.

4. The system of claim 1, further comprising a motor, the motor being coupled to the sleeve and driving rotation of the sleeve about the axis.

5. The system of claim 1, wherein the second sleeve and the sleeve are independently rotatable about the axis.

6. The system of claim 1, further comprising:
a compressive sensing module, the compressive sensing module receiving data recorded by the radiation detector and position data for the at least one aperture, the compressive sensing module generating an azimuthal profile for the wellbore.

7. The system of claim 1, wherein a sampling time is adjusted as a function of aperture size.

8. A system for performing downhole logging operations in a well, comprising:
a downhole suspension device;
an inspection tool coupled to and lowerable into the well, via the suspension device, the inspection tool comprising:
a radiation source operable to emit radiation;
a radiation detector operable to detect backscattered radiation generated as a result of the radiation emitted from the radiation source;
a sleeve positioned around the radiation source, the sleeve including at least one aperture, wherein a position of the at least one aperture is changeable with respect to the well; and
a second sleeve, positioned radially outward of the sleeve, the second sleeve further surrounding the radiation source, wherein the second sleeve further comprises at least one second aperture, a second position of the at least one second aperture changeable with respect to the well.

9. The system of claim 8, wherein the at least one aperture and the at least one second aperture are configured to at least partially align to form a pathway for radiation emitted from the radiation source to enter a formation.

10. The system of claim 8, wherein both the sleeve and the second sleeve are independently rotatable about an axis of the tool, the at least one aperture and the at least one second aperture changing respective positions in response to rotation of the sleeve and the second sleeve.

11. The system of claim 8, wherein the at least one aperture comprises a plurality of apertures, the plurality of apertures arranged in a first pattern, and the at least one second aperture comprises a second plurality of apertures, the second plurality of apertures arranged in a second pattern, different from the first pattern at a given time.

12. The system of claim 8, further comprising:
a motor, the motor being coupled to the sleeve and driving rotation of the sleeve about an axis of the tool.

13. The system of claim 8, further comprising:
a compressive sensing module, the compressive sensing module receiving data recorded by the radiation detector, wherein position data for the at least one aperture is pre-loaded to the compressive sensing module, the compressive sensing module generating an azimuthal profile for the wellbore.

14. A method of performing downhole logging, comprising:
positioning an inspection tool in a well, the inspection tool comprising a radiation generation source, a radiation detector, a sleeve positioned around the radiation source at a first position with respect to the well, and a second sleeve positioned coaxially and radially outward from the sleeve at a second position with respect to the well, the sleeve including at least one aperture and the second sleeve including at least one second aperture;
emitting radiation from the radiation generation source, the radiation being directed through the at least one aperture and the at least one second aperture;
detecting backscattered radiation received at the radiation detector;
determining a first measurement based on the detected backscattered radiation;
associating the first measurement with a first region of the well, corresponding to the first position of the at least one aperture and to the second position of the least one second aperture; and
determining one or more characteristics of the first region of the well, based at least in part on the first measurement.

15. The method of claim 14, further comprising:
changing the first position of the at least one aperture to a third position with respect to the well, the third position corresponding to a second region of the well;
changing the second position of the at least one second aperture to a fourth position with respect to the well, the at least one second aperture being at least partially aligned with the at least one aperture and corresponding to the second region of the well;
determining a second measurement based on the backscattered radiation;
associating the second measurement with the second region of the well; and
determining one or more characteristics of the second region of the well based at least in part on the second measurement.

16. The method of claim 15, further comprising:
processing the first measurement and the second measurement, via a compressive sensing algorithm; and
determining at least one azimuthal characteristic of the wellbore, based at least in part on the processing.

17. The method of claim 14, further comprising:
tracking the first position of the at least one aperture; and
correlating the first position of the at least one aperture with the first measurement.

18. The method of claim 14, further comprising:
rotating the sleeve about the source to change a relative location of the at least one aperture with respect to the well.

* * * * *